Oct. 27, 1942.   J. B. NOWAK   2,300,166
CIRCULAR SCREEN SUPPORT
Filed May 5, 1941
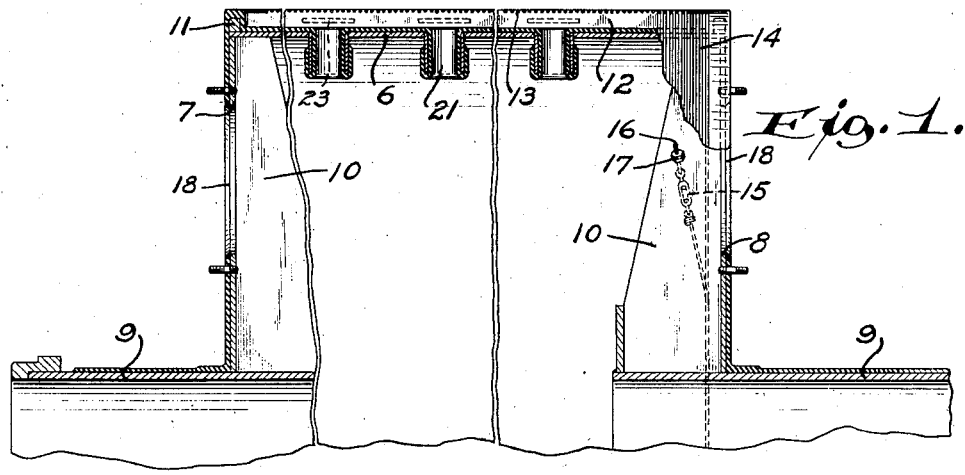
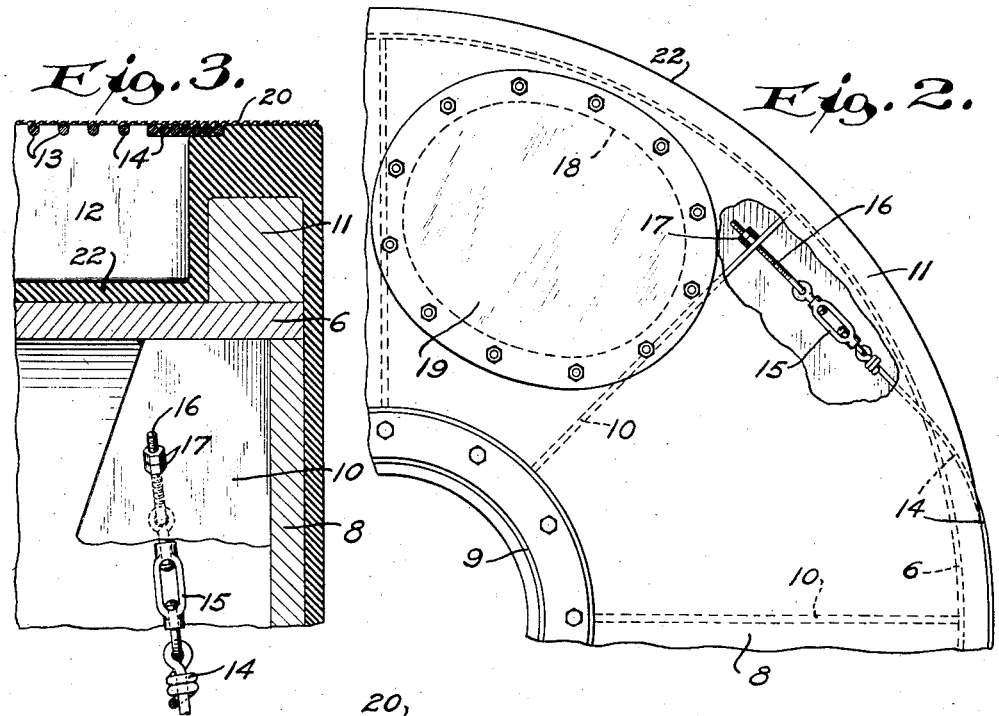
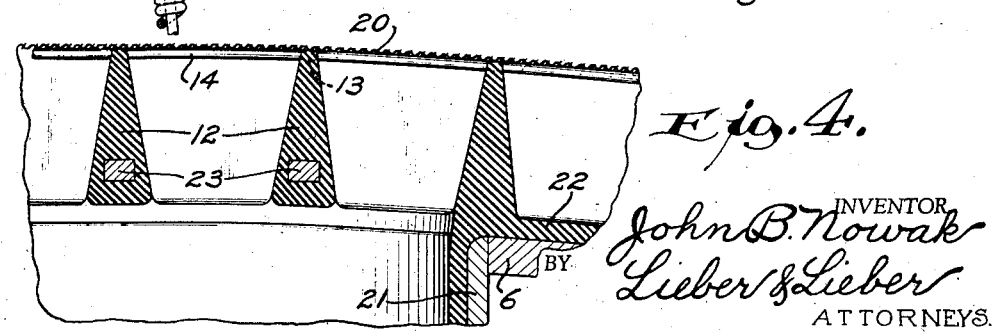
John B. Nowak, INVENTOR
BY Lieber & Lieber
ATTORNEYS.

Patented Oct. 27, 1942

2,300,166

UNITED STATES PATENT OFFICE 2,300,166

CIRCULAR SCREEN SUPPORT

John B. Nowak, Wausau, Wis., assignor to D. J. Murray Manufacturing Co., Wausau, Wis., a corporation of Wisconsin Application May 5, 1941, Serial No. 391,896

4 Claims. (Cl. 210—199)

The present invention relates in general to improvements in structure for supporting relatively thin sheets of filter cloth or screening in circular formation, and relates more specifically to improvements in the construction and operation of cylindrical separating drums for removing liquid from solids such as pulp fibres and granular material.

An object of the invention is to provide an improved circular support for thin flexible sheet material such as filter cloth, which is simple and durable in construction and highly efficient in use.

It is common practice in the paper manufacturing and other industries, to utilize cylindrical drums and rollers having peripheral filtering or screening areas for separating liquids from solids by exposing the mixtures to the separating areas on one side and to suction action to which these areas are subjected, on the opposite side. This type of equipment is used extensively in various types of washing cylinders, wherein the washer drum is mounted for rotation upon trunnions through which liquid is withdrawn by suction from the drum interior, while the cylindrical drum periphery is snugly embraced by relatively thin and highly flexible metal filter cloth against the outer surface of which the washed solid particles are deposited by the internal suction action, and from which the accumulated solids are removed by a scraper blade or the like. Due to the relatively frail and flexible nature of the separating cloth, this filtering medium must be firmly supported upon the drum periphery, and such support is effected by utilizing one or more relatively heavy wires wound helically about the cylinder and coacting either directly with the drum periphery, or with notches formed in parallel laterally spaced ribs extending along the drum from one end head to the other, and against which the cloth is tightly and smoothly stretched. In order to avoid bumps or other unevenness on the exterior of the filter cloth, it is necessary to utilize one or more continuous helically wound backing wires devoid of splices, and it is also desirable to maintain this supporting wire taut at all times since any looseness thereof will tend to cause bulges and uneven areas in the wire cloth.

It is therefore a more specific object of my present invention to provide simple and effective means for maintaining such helically wound backing wires taut so as to insure a smooth surface on the filter cloth at all times.

Another specific object of this invention is to provide compact and efficient mechanism for effecting convenient adjustment of the tension of a filter cloth supporting wire, from within the carrying cylinder where considerable space is available for the adjusting mechanism.

A further specific object of the invention is to provide improved instrumentalities for varying the tension of a filter screen backing wire, which can be applied to new or old cylinders, rollers or drums, at moderate cost and without diminishing the filtering area, and which are also applicable to either one or both ends of each supporting wire.

Still another specific object of the invention is to provide an improved filter cloth mounting and support which is durable and highly efficient, and which can be quickly and conveniently adjusted to maintain the cloth in proper working condition.

These and other specific objects and advantages of the invention will be apparent from the following detailed description.

A clear conception of one embodiment of the present invention as applied to a paper pulp bleaching and washing drum, may be had by referring to the drawing accompanying and forming a part of this specification wherein like reference characters designate the same or similar parts in the various views.

Fig. 1 is a fragmentary central vertical longitudinal section through a typical washing cylinder for pulp or other granular or fibrous solids, and having the invention applied;

Fig. 2 is an end view of the fragment of the cylinder shown in Fig. 1;

Fig. 3 is an enlarged fragment of the wire tensioning portion of the disclosure in Fig. 1; and Fig. 4 is a further enlarged transverse section taken through the periphery of the cylinder.

While the invention has been shown herein as having been specifically embodied in a trunnion supported paper pulp washing drum of a particular type rotatable about a horizontal axis, it is not my desire or intent to thereby unnecessarily restrict the scope or utility of the improvement, which is also applicable to other types of cylinders, drums, and rolls in the paper and other industries, including so-called decker cylinders, dandy rolls, etc.

Referring to the drawing, the rotary washer drum shown therein, comprises in general a cylindrical or annular shell 6 rigidly mounted between spaced end heads 7, 8 which are rotatably supported by alined end trunnions 9 projecting into the shell 6 and connected thereto and to the end heads 7, 8 by means of radial ribs 10. In the specific device shown, the end heads 7, 8 have outwardly extending rigid peripheral flanges 11, and the periphery of the shell 6 between these flanges 11 is provided with an annular series of parallel ribs 12 the outer edge of each of which has a series of notches 13 therein. A filter cloth supporting wire 14 has its one end attached to the flange 11 of the end head 7, and is wound helically about and along the shell 6 within the rib notches 13, and the opposite end of the wire 14 is projected tangentially through the drum shell 6 closely adjacent to the flange 11 of the other end head 8. The inwardly projected end of the wire 14 is journalled in one end of a turn-buckle 15, the opposite end of which is connected to a threaded eye-bolt 16 piercing an adjacent radial rib 10 and coacting with nuts 17; and the interior of the shell 6 adjacent to the turn-buckle 15, eye-bolt 16, and nuts 17 is accessible through a manhole 18 in the end head 8 which is normally closed by a removable cover 19. The helical supporting wire 14 is snugly embraced by a cylindrical metal wire filter cloth 20, and the spaces between the successive elongated ribs 10 are connected through radial ducts 21 and connecting conduits, not shown, with one or both trunnions 9 the interiors of which are normally connected to a suction pump or other vacuum source. The drum assemblage is ordinarily mounted for continuous rotation upon its supporting trunnions 9 by any suitable driving means, not shown, and a scraper blade normally coacts with the filter cloth 20 at a convenient place for most effective removal of accumulated solids as the drum revolves.

While these drum assemblages may be formed entirely of metal, it is desirable for some uses, to cover the exposed metal parts with a layer 22 of hard rubber or the like, and to also form the ribs 12 of the same material. When the parallel wire and cloth supporting ribs 12 are formed of hard rubber, as shown, the portions of these ribs which span the suction ducts 21 are preferably reinforced by metal inserts 23. The wire 14 is preferably of continuous one-piece formation devoid of splices so that it can slide freely in the notches 13 when an end pull is exerted thereon, and this supporting wire is subjected to a tension of several hundred pounds when it is being wound upon the drum and within the grooves or notches 13. In spite of this initial high tension, these helical wires 14 frequently expand and stretch thus becoming relatively loose and providing an unstable and uneven support for the filter cloth 20, and this lengthening of the wires 14 can be quickly and effectively compensated for by merely adjusting the nuts 17 upon the eye-bolt 16 whereupon the wire 14 will be pulled longitudinally into snug engagement with the rib notches 13.

The supporting wire or wires 14, need not necessarily coact with ribs 12, but may coact directly with the periphery of the drum or roll; and when relatively long wires 14 are used, it is preferable to apply one of the improved tensioning devices to each end of each wire. It is moreover not essential to utilize only a single wire 14 as a support, since any number of these continuous helical supports may be employed, and any other suitable end pulling tensioning means may be substituted for the turn-buckles.

During normal operation of the improved assemblage, the drum is being continuously rotated about the horizontal axis of the supporting trunnions 9, and the circular revolving filter cloth 20 is being constantly exposed on its outer side to a mixture of liquid and pulp fibre or other solids, while the interior thereof is subjected to suction action through the spaces between the ribs 12, the ducts 21, and the trunnions 9. This reduced pressure on the inside of the filtering cloth 20, causes the liquid to be withdrawn from the solids, and the latter are deposited in the form of a layer upon the outer surface of the cloth from whence it is removed by a scraper or the like. The taut backing wire or wires 14 and the ribs 12 will obviously coact with the inner surface of the screening cloth 20, to provide a firm and smooth support, and if any of the wires 14 elongate and become loose in the notches 13, they can be quickly and conveniently tightened or restretched by merely removing the manhole cover 19 and manipulating the nuts 17 through the exposed opening 18, with the aid of a wrench.

From the foregoing detailed description it will be apparent that my present invention provides simple and effective means for insuring a firm and smooth support for the annular filter cloth 20, at all times, thereby producing most efficient operation and prolonging the life of the cloth to a maximum. The improved wire stretching and tensioning mechanism can obviously be applied within the drum to either new or old drum assemblages, at moderate cost, and can be quickly and conveniently manipulated since it is located within the drum where considerable space is available. The invention has proven highly successful in commercial operation when applied to a pulp washing drum assemblage, but may also be applied to other types of circular screen or filter cloth supports for other classes of machinery.

It should be understood that it is not desired to limit this invention to the exact details of construction herein shown and described for various modifications within the scope of the claims may occur to persons skilled in the art.

I claim:

1. In combination, an annular shell having parallel outwardly projecting peripheral ribs each provided with a series of outer edge notches and also having a radial inwardly projecting rib near one end, a wire wound helically within said notches and having an end tangentially piercing said shell beyond the adjacent ends of said peripheral ribs and directed toward said radial rib at approximately a right angle, means coacting with said wire end and with said radial rib for tensioning the wire throughout its entire length and for retaining the same snugly confined within said notches, and a filter element snugly engaging said helical wire and embracing said shell.

2. In combination, an annular shell having parallel outwardly projecting peripheral ribs each provided with a series of outer edge notches and also having a radial inwardly projecting rib near one end, a wire wound helically within said notches and having an end tangentially piercing said shell beyond the adjacent ends of said peripheral ribs and directed toward said radial rib at approximately a right angle, a turn-buckle coacting with said wire end between said radial rib and the adjacent shell periphery and being operable to tension the wire throughout its entire length and to thereby retain the same snugly confined within said notches, and a filter element snugly engaging said helical wire and embracing said shell.

3. In combination, an annular shell having parallel outwardly projecting peripheral ribs each provided with a series of outer edge notches and also having a radial inwardly projecting rib confined therein near one end, a wire wound helically within said notches and having an end tangentially piercing said shell beyond the adjacent ends of said peripheral ribs and directed into the shell interior approximately perpendicular to said radial rib, means within said shell and coacting with said wire end and with said radial rib for tensioning said wire throughout its entire length and for retaining the same snugly confined within said notches, means for effecting access to said tensioning means from the exterior of said shell, and a filter element engaging said helical wire and embracing said shell.

4. In combination, an annular shell having parallel outwardly projecting peripheral ribs each provided with a series of outer edge notches and also having a radial inwardly projecting rib confined therein near one end, a wire wound helically within said notches and having an end tangentially piercing said shell beyond the adjacent ends of said peripheral ribs and directed into the shell interior approximately perpendicular to said radial rib, a turn-buckle coacting with said wire end between said radial rib and the adjacent shell periphery entirely within said shell and being manipulable to tension the wire throughout its entire length and to thereby retain the same snugly confined within said notches, a removable cover coacting with the end of said shell for effecting access to said turn-buckle, and a filter element engaging said helical wire and embracing said shell.

JOHN B. NOWAK.